(12) United States Patent
Guntermann et al.

(10) Patent No.: US 11,424,658 B2
(45) Date of Patent: Aug. 23, 2022

(54) CARRIER CLAMPING FEATURE FOR STATOR-FIXATION USED IN CLIMATE COMPRESSORS FOR VEHICLE APPLICATIONS

(71) Applicant: Hanon Systems, Daejeon (KR)

(72) Inventors: Bernd Guntermann, Lennestadt (DE); David Walisko, Hürth (DE); Stephan Heinrichs, Hürtgenwald (DE)

(73) Assignee: HANON SYSTEMS, Daejeon (KR)

( * ) Notice: Subject to any disclaimer, the term of this patent is extended or adjusted under 35 U.S.C. 154(b) by 290 days.

(21) Appl. No.: 16/774,085

(22) Filed: Jan. 28, 2020

(65) Prior Publication Data

US 2020/0313502 A1    Oct. 1, 2020

(30) Foreign Application Priority Data

Mar. 25, 2019   (DE) .......................... 102019107529.7

(51) Int. Cl.
| | |
|---|---|
| *H02K 5/22* | (2006.01) |
| *B60H 1/32* | (2006.01) |
| *F04B 35/04* | (2006.01) |
| *F04B 39/12* | (2006.01) |
| *H02K 1/18* | (2006.01) |

(Continued)

(52) U.S. Cl.
CPC ........... *H02K 5/225* (2013.01); *B60H 1/3222* (2013.01); *F04B 35/04* (2013.01); *F04B 39/12* (2013.01);

(Continued)

(58) Field of Classification Search
CPC .......... H02K 5/225; H02K 1/18; H02K 3/522; H02K 5/12; H02K 11/33; H02K 15/02;
(Continued)

(56) References Cited

U.S. PATENT DOCUMENTS

| | | | | |
|---|---|---|---|---|
| 7,385,323 | B2 * | 6/2008 | Takahashi | .............. H02K 3/522 |
| | | | | 310/260 |
| 7,663,277 | B2 * | 2/2010 | Kinoshita | .............. H02K 29/08 |
| | | | | 310/68 B |

(Continued)

FOREIGN PATENT DOCUMENTS

| | | |
|---|---|---|
| CN | 103095061 A | 5/2013 |
| CN | 104541062 A | 4/2015 |

(Continued)

*Primary Examiner* — John K Kim
(74) *Attorney, Agent, or Firm* — Shumaker, Loop & Kendrick, LLP; James D. Miller (57) ABSTRACT

A device for driving a compressor of a vaporous fluid, in particular an electric motor. The device includes a rotor and a stator having a stator core, arranged extending along a common longitudinal axis. A carrier element, which is formed having at least one receptacle element for a plug housing for accommodating at least one plug connector and also at least one clamping element for fixing the carrier element on the stator core as a coherent unit and one-piece component, is arranged pressing against a first end face of the stator aligned in an axial direction. The at least one clamping element is arranged on a side of the carrier element aligned in the axial direction and facing toward the stator core and having an inner side pressing against an outer side of an outer wall of the stator core, centering the carrier element on the stator core.

32 Claims, 5 Drawing Sheets

(51) Int. Cl.
  *H02K 3/52* (2006.01)
  *H02K 5/12* (2006.01)
  *H02K 11/33* (2016.01)
  *H02K 15/02* (2006.01)

(52) U.S. Cl.
  CPC .............. *H02K 1/18* (2013.01); *H02K 3/522* (2013.01); *H02K 5/12* (2013.01); *H02K 11/33* (2016.01); *H02K 15/02* (2013.01); *B60H 2001/3286* (2013.01)

(58) Field of Classification Search
  CPC ........ H02K 3/38; H02K 15/105; H02K 15/14; B60H 1/3222; B60H 2001/3286; B60H 1/3204; F04B 35/04; F04B 39/12; F04B 39/121; F04C 23/02; F04C 29/0085; F04C 2210/26; F04C 2230/60; F04C 2240/40; F04C 2240/805
  USPC .......................................................... 310/71
  See application file for complete search history.

(56) References Cited

U.S. PATENT DOCUMENTS

| | | | |
|---|---|---|---|
| 2007/0113572 A1* | 5/2007 | Baruschke | B60H 1/3222 62/239 |
| 2009/0127953 A1 | 5/2009 | Yumoto et al. | |
| 2011/0080062 A1 | 4/2011 | Noh et al. | |
| 2013/0251573 A1 | 9/2013 | Duppert et al. | |
| 2016/0356274 A1* | 12/2016 | Duppert | F04C 23/008 |
| 2017/0244299 A1* | 8/2017 | Poon | H02K 3/522 |
| 2018/0248444 A1 | 8/2018 | Chen et al. | |
| 2020/0313502 A1* | 10/2020 | Guntermann | H02K 3/38 |

FOREIGN PATENT DOCUMENTS

| | | |
|---|---|---|
| CN | 105830314 A | 8/2016 |
| CN | 107093936 A | 8/2017 |
| KR | 20110036271 A | 4/2011 |
| KR | 20180023166 A | 3/2018 |
| WO | 2015146677 A1 | 10/2015 |

\* cited by examiner

CARRIER CLAMPING FEATURE FOR STATOR-FIXATION USED IN CLIMATE COMPRESSORS FOR VEHICLE APPLICATIONS

CROSS-REFERENCE TO RELATED PATENT APPLICATIONS

The present disclosure claims the benefit of German Patent Application No. DE 1020191075297.0 filed Mar. 25, 2019, the content of which is hereby incorporated herein by reference in its entirety.

FIELD

The invention relates to a device for driving a compressor, in particular an electric motor, for compressing a vaporous fluid, especially a refrigerant. The compressor can be used in the refrigeration circuit of a climate control system of a motor vehicle. The device comprises a rotor and a stator having a stator core, which are arranged extending along a common longitudinal axis.

The invention moreover relates to a method for installing the device for driving a compressor.

BACKGROUND

Compressors known from the prior art for mobile applications, in particular for climate control systems of motor vehicles, for conveying refrigerant through a refrigeration circuit, also referred to as refrigerant compressors, are often designed as piston compressors having variable stroke volume or as scroll compressors, independently of the refrigerant. The compressors are driven either via a belt pulley or electrically in this case.

An electrically driven compressor comprises, in addition to the electric motor for driving the respective compression mechanism, an inverter for driving the electric motor. The inverter is used for converting direct current of a vehicle battery into alternating current, which is supplied to the electric motor through electrical connections.

Conventional electric motors of the electrically driven compressors are formed having a ring-shaped stator core having coils arranged thereon and a rotor, wherein the rotor is arranged inside the stator core. Rotor and stator are aligned on a common axis of symmetry and/or axis of rotation of the rotor.

The inverter comprises plug ports for plug connectors formed as separate components and pins for the electrical connection to terminals of the electric motor, which are in turn electrically connected to the coils of the stator. The terminals of the electric motor are formed in a plug housing, which is arranged on an end face of the stator aligned in the axial direction of the stator.

In the electric motors associated with the prior art of the electrically driven compressors, a plug housing is fastened on the stator insulation by being pressed on. At the same time, the plug housing is fixed during the installation. During the operation of the compressor and thus of the electric motor, the press fit produced during the assembly between the plug housing and the stator insulation can loosen, so that the plug housing moves and oscillates in relation to the surroundings, in particular the stator insulation, which causes a material abrasion on the surfaces arranged touching.

During the installation of an electric motor in a compressor, the connecting lines of the conducting wires of the coils, which are fastened on terminal clamps and are guided in curves on the stator core, generate a tangential force acting outward circularly in the radial direction, which can result in a displacement of the plug housing. Moreover, the plug housing can be placed in various arrangements in relation to the stator, although only one special arrangement has the result that the connecting lines of the conducting wires can be inserted correctly into connecting ports of the plug housing. During the process of the assembly, an incorrect arrangement of the plug housing results in a greater time expenditure for reconfiguration and rearrangement of the plug housing.

It is therefore absolutely necessary for the installation of the stator in the motor housing to fix the plug housing in a predetermined position on the stator, so that the plug connectors, which are arranged on the inverter and formed as pins, engage in the connecting ports provided in the plug housing.

An electrically driven compressor having a compression arrangement, an electric motor for driving the compression arrangement, and an inverter for supplying the electric motor with voltage is disclosed in WO 2015 146677 A1. The electric motor comprises a rotor and a stator having an electrically insulated coil body arranged at one end of a stator core, coils arranged on the coil body, and a plug housing having connecting ports for electrically connecting the coils to the inverter. The plug housing is mechanically connected at the end face to the stator with the aid of catch devices and/or a spring closure, in particular via snap hooks, on the coil body.

Connecting lines as electrical connections of the conducting wires of the coils always have to be attached before the plug housing is fastened on the coil body. Moreover, the plug housing is fixed inside an outer diameter of the stator core, which, depending on tolerances during the manufacturing and/or during the installation, can result in tilting of the plug housing and thus a displacement out of the required position.

SUMMARY

The object of the present invention consists of providing and improving a device for driving an electrically driven compressor of a vaporous fluid, in particular an electric motor, which may be installed in a simple and thus time-saving manner. In this case, in particular the plug housing is to be fixable on the stator in a predefined position and thus a relative movement of the plug housing having the connecting ports formed in the plug housing for accommodating plug connectors of the inverter with respect to the stator, especially also a displacement or tilting and/or inclination of the plug housing with respect to the stator, is to be prevented during the installation of the device. The device is to comprise the smallest possible number of individual components and parts and is to be implementable with a simple design to also minimize costs during the production.

The object is achieved by the subjects having the features as disclosed herein.

The object is achieved by a device according to the invention for driving a compressor of a vaporous fluid, in particular an electric motor. The device comprises a rotor and a fixed stator having a stator core, which extend along a common longitudinal axis.

The stator is advantageously positioned in the radial direction on an outer side of the rotor, enclosing the rotor.

According to the concept of the invention, a carrier element is arranged pressing against a first end face of the stator aligned in an axial direction. The carrier element is formed having at least one receptacle element for a plug housing for accommodating at least one plug connector and at least one clamping element for fixing the carrier element on the stator core as a coherent unit and one-piece component, so that in each case both the receptacle element and also the clamping element are a component part of the carrier element. The carrier element is thus designed as a multifunctional component, in particular of the stator.

The at least one clamping element is arranged according to the invention pressing against a side of the carrier element aligned in the axial direction and facing toward the stator core and also having an inner side pressing against an outer side of an outer wall of the stator core, centering and fixing the carrier element on the stator core.

The axial direction is to be understood in this case as the direction of the longitudinal axis of the stator, which also corresponds to the longitudinal axis and the axis of rotation of the rotor. An end face aligned in the axial direction is arranged in a plane aligned perpendicularly to the longitudinal axis.

The at least one receptacle element is advantageously formed having at least one connecting passage, which corresponds to a connecting port of the plug housing for accommodating plug connectors of electrical connections.

According to one refinement of the invention, the at least one clamping element has the shape in cross section of two legs, formed linearly in particular, and arranged at an angle in relation to one another. The legs are advantageously arranged at a right angle in relation to one another.

Moreover, the legs of the clamping element are preferably arranged pressing against one another on outer lateral edges and enclosing the angle at end edges and are connected to one another. In this case, a first leg is preferably arranged facing in the radial direction and has the shape of a circular ring or a circular ring section, while a second leg is arranged facing in the axial direction and has the shape of a cylinder or a cylinder section, in particular a hollow circular cylinder. With the arrangement of the second leg in the axial direction, a first free end edge of the second leg of the clamping element is aligned in particular in the direction of a second end face opposite to the first end face of the rotor.

According to one preferred embodiment of the invention, the carrier element is formed having a radially aligned ring surface and also having an axially aligned ring surface, which are arranged pressing against one another on outer lateral edges and are connected to one another. The receptacle element for the plug housing is preferably formed as a portion of the radially aligned ring surface of the carrier element.

The radially aligned ring surface of the carrier element advantageously has the shape of a circular ring, in particular of a section of a circular ring or an open circular ring, while the axially aligned ring surface of the carrier element is preferably formed cylindrical and/or in the shape of a cylinder section, in particular in the shape of a circular cylinder, especially in the shape of a hollow circular cylinder.

The at least one clamping element is preferably arranged in a region of a free end edge of the axially aligned ring surface. In this case, the clamping element is in particular connected along a first end edge of the first leg to the axially aligned ring surface of the carrier element.

A further advantage of the invention is that the at least one clamping element presses flatly against the outer side of the outer wall of the stator core in the region of the second leg with an inner side. In this case, the inner side of the second leg of the clamping element and the outer side of the outer wall of the stator core are formed having surfaces corresponding to one another for the contact oriented toward one another. Moreover, a radius of the inner side of the clamping element, in particular of the second leg, especially in the uninstalled state of the device, is formed less than a radius of the outer side of the outer wall of the stator core such that the clamping element is elastically deformed in the installed state of the device and a pressure force is generated in this manner between the clamping element and the stator core.

The carrier element can comprise, for example, a single clamping element which extends over the entire circumference or at least in an angle range of at least 270° around the carrier element, or a plurality of clamping elements, which are arranged distributed over the circumference of the carrier element. At least two clamping elements are to be considered a plurality.

If the carrier element is formed having a plurality of clamping elements, the clamping elements can be formed having different or equal lengths in the circumferential direction of the carrier element. Moreover, the clamping elements can be arranged at different or equal intervals in relation to one another in the circumferential direction of the carrier element. The carrier element can thus comprise three clamping elements, which are each formed having an equal length and are distributed uniformly around the circumference and thus in particular are arranged at an angle of 120° in relation to one another in each case.

According to one advantageous embodiment of the invention, the device comprises a system for exactly positioning the carrier element on the stator core, in particular in the circumferential direction of the stator, having at least one first element and at least one second element, which together form a formfitting connection. The system can also be used as a twist lock of the carrier element in the circumferential direction of the stator. The formfitting connection is to be understood in this case to mean that the connecting elements have shapes corresponding to one another at least in regions, which do not necessarily press against one another. The first element and the second element preferably each have a shape formed symmetrically in relation to the longitudinal axis.

In this case, the first element of the system is preferably designed for positioning the carrier element in the circumferential direction of the stator on the outer side of the outer wall of the stator core and the second element on the carrier element, in particular on the clamping element of the carrier element. The second element of the system is provided in particular on the inner side of the leg of the clamping element pressing against the stator core, while the first element of the system is formed as a recess inside the outer wall of the stator core, which extends along the outer side of the outer wall of the stator core originating from the first end face formed with the carrier element of the stator in parallel to the longitudinal axis of the stator.

According to one refinement of the invention, the first element of the system has the shape of a groove, which is advantageously formed having a semicircular cross section which is in particular constant over the length, while the second element of the system is preferably formed as a formation which corresponds to the shape of the first element of the system. The second element of the system is preferably formed as a formation protruding from an inner side of the clamping element pressing against the outer side of the outer wall of the stator core, in particular of the second leg of the clamping element, which extends in the direction of the longitudinal axis of the stator and has a semicircular cross section. In this case, the second element of the system for positioning the carrier element on the stator core can have a shape tapering in the direction of a second end face opposite to the first end face of the stator, in the direction of the longitudinal axis of the stator. The second element of the system is preferably arranged at a transition of the leg of the clamping element of the carrier element.

If in each case at least two first elements and second elements of the system for positioning the carrier element on the stator core are formed, the respective elements corresponding to one another are advantageously arranged distributed unevenly over the circumference of the stator. The elements are asymmetrical here, arranged at an unequal interval on the circumference and/or each aligned at different angles in relation to one another.

The system for the exact positioning of the carrier element on the stator core and/or for the twist lock of the carrier element in a circumferential direction of the stator is therefore especially used as a positioning unit of the connecting ports of the plug housing on the stator core of the stator. The correct and concentric positioning of the carrier element having the receptacle element for the plug housing prevents in this case undesired arrangements and relative movements of the plug housing in the radial and circular-tangential direction during the entire installation process and the operation of the device.

According to one refinement of the invention, the carrier element comprises at least one elastically deformable pressure element having a contact region. In this case, the pressure element and the receptacle element for arranging the plug housing having connecting ports are arranged on a common side of the carrier element aligned in the axial direction.

The pressure element is formed extending essentially having dimensions in the axial direction. In an installed state of the device, the pressure element presses with the contact region on a counter surface while elastically deforming. The contact region of the pressure element can be formed, for example, as a contact surface, as a contact edge, or also punctiform.

As a result of the pressure applied by the elastic deformation of the pressure element on the carrier element, the carrier element with the receptacle element having the connecting passages for the plug housing for the connecting ports is pressed against the stator and in this manner a further protection from undesired relative movements of the carrier element in relation to the stator is ensured.

The object is also achieved by a method according to the invention for installing the device for driving a compressor of a vaporous fluid, in particular an electric motor. The method comprises the following steps:

arranging a rotor and a stator on a common longitudinal axis, wherein the stator encloses the rotor in the radial direction, and arranging a carrier element on a first end face of the stator aligned in an axial direction, wherein at least one clamping element is arranged on the stator core aligned in the axial direction and aligned with a side of the carrier element facing toward a stator core of the stator and the at least one clamping element is elastically deformed in such a way that a force acting essentially in a radial direction on the stator core, in particular a spring force or clamping force, is generated between the clamping element and an outer side of an outer wall of the stator core and the carrier element is clamped on the stator core.

The advantageous design of the invention enables the use of the device for driving a compressor, in particular an electric motor, for compressing a vaporous fluid for a compressor of the refrigerant in a refrigeration circuit of a climate control system of a motor vehicle.

The device according to the invention for driving a compressor of a vaporous fluid using a minimal number of required components has the further diverse advantages in summary:

centering and fixing the carrier element having the at least one receptacle element for a plug housing having the at least one connecting port on the stator by means of the at least one clamping element, thus unique positioning of the plug housing having the connecting ports as a result of the unique positioning of the carrier element having the receptacle element for the plug housing before an installation in the motor housing, therefore exact connection of the plug connectors, which are arranged on the inverter and formed as pins, in the connecting ports formed in the plug housing inserted in the carrier element even after the shrinking in the motor housing, the installation of the connecting lines as electrical connections of the conducting wires of the coils and thus the insertion of the plug housing into the receptacle element of the carrier element can be performed both before the installation and also after the installation of the carrier element on the stator, preventing relative movements of the carrier element having the receptacle element and thus of the plug housing having the connecting ports for accommodating plug connectors of the inverter with respect to the stator or the stator core, respectively, in particular displacement or tilting and also twisting around the longitudinal axis of the stator, during the installation of the device, in particular the stator in the motor housing, thus simple installation of the device, in particular during the introduction of the stator with the rotor into the motor housing, at the same time reduction of the production of discards and finish machining.

BRIEF DESCRIPTION OF THE DRAWINGS

Further details, features, and advantages of embodiments of the invention result from the following description of exemplary embodiments with reference to the associated drawings. In the figures.

DETAILED DESCRIPTION OF THE EMBODIMENTS

Figure 1A:
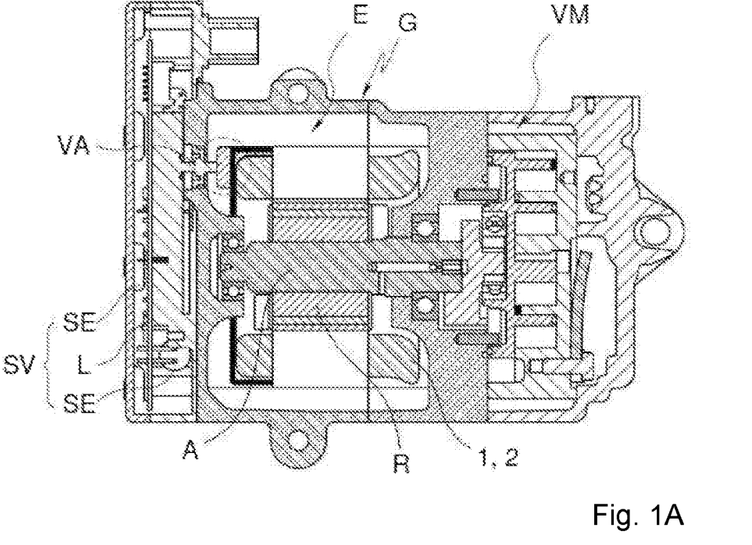
FIG. 1A: shows an electrically driven compressor having an electric motor as a device for driving a compression mechanism in a sectional illustration.

An electrically driven compressor having an electric motor E arranged in a housing G as a device for driving a compression mechanism VM is shown in a sectional illustration in FIG. 1A. The electric motor E is supplied with electrical energy via a switching device SV.

The electric motor E comprises a stator 1 having an essentially hollow-cylindrical stator core 2 and coils wound on the stator core 2 and also a rotor R arranged inside the stator 1. The rotor R is set into a rotational movement when electrical energy is supplied to the coils of the stator 1 via a connecting arrangement VA. The connecting arrangement VA is formed on an end face of the stator 1 and comprises a plurality of electrical terminals.

The rotor R is arranged coaxially inside the stator 1 and so it is rotatable around an axis of rotation. A driveshaft A can be formed integrally with the rotor R or as a separate element.

The electric motor E and also the compression mechanism VM, which is formed as a scroll compressor having a stationary spiral and an orbiting spiral, are arranged inside a volume enclosed by the housing G. In this case, the housing G is formed from a first housing element for accommodating the electric motor E and a second housing element for accommodating the compression mechanism VM and also preferably from a metal, in particular an aluminum.

The orbiting spiral of the compression mechanism VM, in which the vaporous fluid, especially a refrigerant, is compressed, is driven via the driveshaft A connected to the rotor R of the electric motor E. According to an embodiment which is not shown in greater detail, the compression mechanism can also be formed having a swash plate.

The switching device SV for controlling the operation of the electric motor E comprises a circuit board L formed having various switching elements SE. Different control circuits and components, which are supplied with electrical energy from a power line of an external power source, are installed in an electrically connected manner on the circuit board L.

Figure 1B:
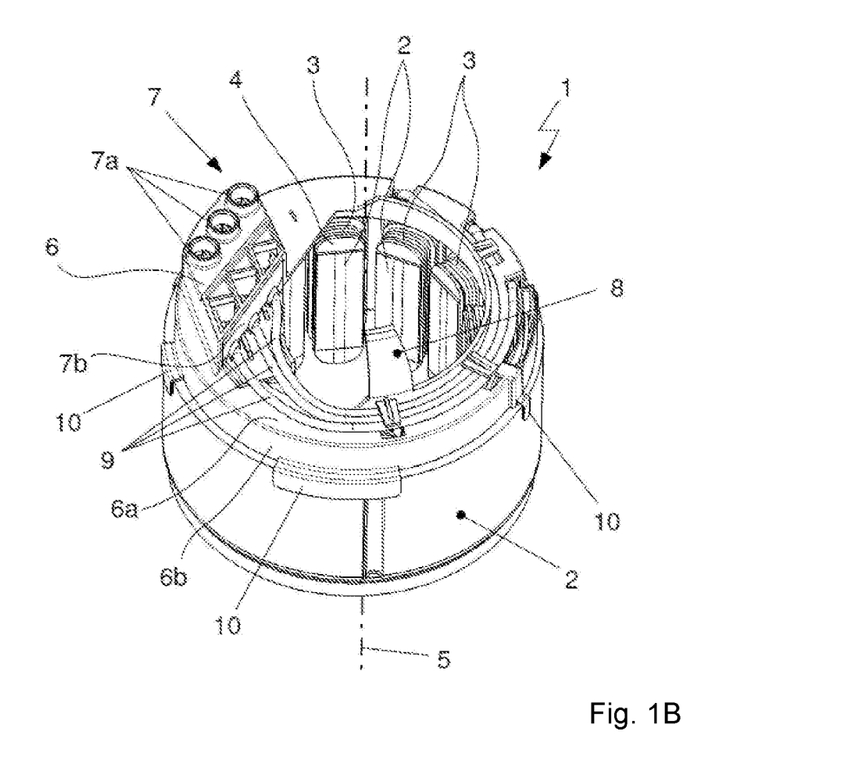
FIG. 1B: shows a stator of an electric motor as a device for driving a compressor of a vaporous fluid having a stator core, coils, an insulation element, and a carrier element having clamping elements and a receptacle element for a plug housing in a perspective view.

The stator 1 of the electric motor as a device for driving a compressor of a vaporous fluid, especially for a climate control system of a motor vehicle for conveying refrigerant through a refrigeration circuit, is shown in a perspective view in FIG. 1B. The stator 1 is formed having the stator core 2, coils 3, an insulation element 4, and also a carrier element 6 having clamping elements 10 and a receptacle element 7 for a plug housing 7b as components of the connecting arrangement VA.

The electric motor, for example, an AC motor having three phases, comprises the rotor (not shown) and the stator core 2, which is arranged in the radial direction on an outer side of the rotor and thus around the rotor. The stator core 2, which is preferably formed as a laminated core, and the insulation element 4, which is formed from an electrically insulating material, each extend along a longitudinal axis 5, which also corresponds to the longitudinal axis of the stator 1 and the axis of rotation of the rotor, from a first end face to a second end face of the stator 1. The insulation element 4 is advantageously formed as an extrusion coating of the stator core 2 and thus as a one-piece component.

The coils 3 are each made of a wire wound around a region of the stator core 2 extending inward in the radial direction, also referred to as conducting wire 9. The non-wound ends of the conducting wires 9 are led out of the respective winding as connecting lines. The regions of the stator core 2 extending inward in the radial direction each have the shape of a web and are positioned distributed uniformly around the circumference of an outer wall of the stator core 2. The insulation element 4, which electrically insulates the stator core 2 and the wires of the coils 3 in relation to one another, is arranged between the wires of the coils 3 and the respective regions of the stator core 2. The insulation element 4 is formed widened in the axial direction in each case at the ends of the webs aligned inward and in the axial direction. The end sections of the insulation element 4 protruding in this manner are used for fixing the wires of the coils 3 wound around the webs of the stator core 2. The stator core 2, the insulation element 4, and the coils 3 form the stator unit of the electric motor.

The insulation element 4 protrudes beyond the stator core 2 at each of the end faces of the stator 1. At the first end face of the stator 1, the carrier element 6 having the receptacle element 7 having connecting passages 7a for the plug housing 7b having connecting ports is arranged. The connecting ports of the plug housing 7b are each used as a component of an electrical connection between the coils 3 of the electric motor and the inverter, for example, with the aid of electrically conductive, pin-shaped connecting elements, which are arranged guided through the connecting passages 7a of the receptacle element 7 of the carrier element 6 and inserted into the connecting ports of the plug housing 7b.

The conducting wires 9 of the coils 3 and the connecting ports of the plug housing 7b arranged in the receptacle element 7 are electrically connected to one another via the connecting lines, also referred to as phase conductors.

The carrier element 6 presses in the installed state of the stator 1 against the stator 1, in particular the stator core 2, in the axial direction, on the one hand. In this case, the outer diameter of the carrier element 6 is less than the outer diameter of the stator core 2.

Moreover, the carrier element 6 having the receptacle element 7 for the plug housing 7b having the connecting ports comprises an elastic pressure element 8 extending essentially in the axial direction, on the other hand. The receptacle element 7 and the pressure element 8 are arranged on a common side of the carrier element 6, which is aligned in the axial direction and faces away from the stator core 2.

The carrier element 6 moreover comprises a radially aligned ring surface 6a in the shape of a circular ring, in particular a section of a ring surface in the shape of a circular ring, and also an axially aligned cylindrical, in particular hollow-cylindrical ring surface 6b, which are arranged abutting one another and connected to one another at outer lateral edges. The receptacle element 7 for the plug housing 7b is formed as a portion of the radially aligned ring surface 6a and thus as a component part of the carrier element 6.

The hollow-cylindrical wall of the axially aligned ring surface 6b of the carrier element 6 is formed having an outer diameter which is less than the outer diameter of the outer wall of the stator core 2, and an inner diameter which is greater than the inner diameter of the outer wall of the stator core 2.

The elastic pressure element 8 is arranged in a region, in particular an inner lateral edge, of the radially aligned ring surface 6a in the shape of a circular ring and preferably has the shape of a curve and/or a spring. In this case, the pressure element 8, like the receptacle element 7 for the plug housing 7b, is formed as a component part of the carrier element 6. The carrier element 6 having the radial ring surface 6a, the axial ring surface 6b, the receptacle element 7 having the connecting passages 7a for the plug housing 7b having the connecting ports, and the pressure element 8 is formed as a unit, in particular as a one-piece injection molded element. The one-piece formation is implemented within a forming process.

The pressure element 8 comprises a web arranged aligned essentially in the axial direction and a contact region arranged aligned essentially in the radial direction. In this case, the pressure element 8 is connected via an end edge of the web to the radial ring surface 6*a*. At an end formed distal to the end edge of the web, the pressure element 8 comprises the contact region, which is advantageously formed as a contact surface. In the installed state of the electric motor, the pressure element 8 presses with the contact region on a housing (not shown) of the electric motor. During the installation of the stator 1 having the carrier element 6 inside the motor housing, i.e., especially during the joining or shrinking of the stator 1 in the motor housing and the pressure applied in this case of the motor housing to the pressure element 8, in particular the web of the pressure element 8 is elastically deformed.

The pressure element 8 comprises, as a component of the carrier element 6, a defined rigidity corresponding to the geometry and the mechanical dimensions of the carrier element 6. During the installation of the stator 1 in the motor housing, a force acting essentially in the axial direction, in particular a spring force, is built up between the carrier element 6 and a surface formed as a closed end of the motor housing, and the carrier element 6 is thus pressed because of the elastic properties of the pressure element 8 in the direction of the stator 1, in particular the stator core 2. In this case, the force acts on the carrier element 6 with the pressing of the pressure element 8 against the motor housing and the elastic deformation of the pressure element 8. After the procedure of the installation of the electric motor and therefore after the procedure of the joining or pressing of the stator 1 having the carrier element 6 into the motor housing, a pre-tension is therefore generated by means of the deformation of the pressure element 8, which clamps the carrier element 6 and prevents movements of the carrier element 6 and/or of the receptacle element 7 having the plug housing 7*b* during the operation of the electric motor and thus the compressor. The carrier element 6 is especially fixed in the axial direction in this case.

During the installation of the electric motor, the connecting lines of the conducting wires 9, which are fastened on terminal clamps in the plug housing 7*b* and are guided curved in the carrier element 6, generate a tangential force acting outward circularly in the radial direction, which can effectuate a displacement and/or twist of the carrier element 6 having the receptacle element 7 for the plug housing 7*b* out of the required location. Moreover, the carrier element 6 can tilt out of the required position due to the acting forces with respect to the longitudinal axis 5 of the stator 1 and can thus be moved in particular out of a plane spanned perpendicularly to the longitudinal axis 5. The plug housing 7*b* is positioned inside the receptacle element 7 and at the same time between the carrier element 6 and the insulation element 4. Since the plug connectors, which are formed as separate components in pins and are arranged via connecting ports on the inverter, can only be arranged engaging in the connecting ports formed in the plug housing 7*b* in the required location of the plug housing 7*b* and thus of the receptacle element 7 having the connecting passages 7*a* in relation to the stator 1, the carrier element 6 having the receptacle element 7 is to be fixed in the required location on the stator 1 before the installation of the stator 1 in the motor housing, in order to prevent the displacement and/or twisting, on the one hand, and to prevent the tilting of the plug housing 7*b* arranged in the receptacle element 7 in relation to the stator 1, on the other hand.

Figure 2A:
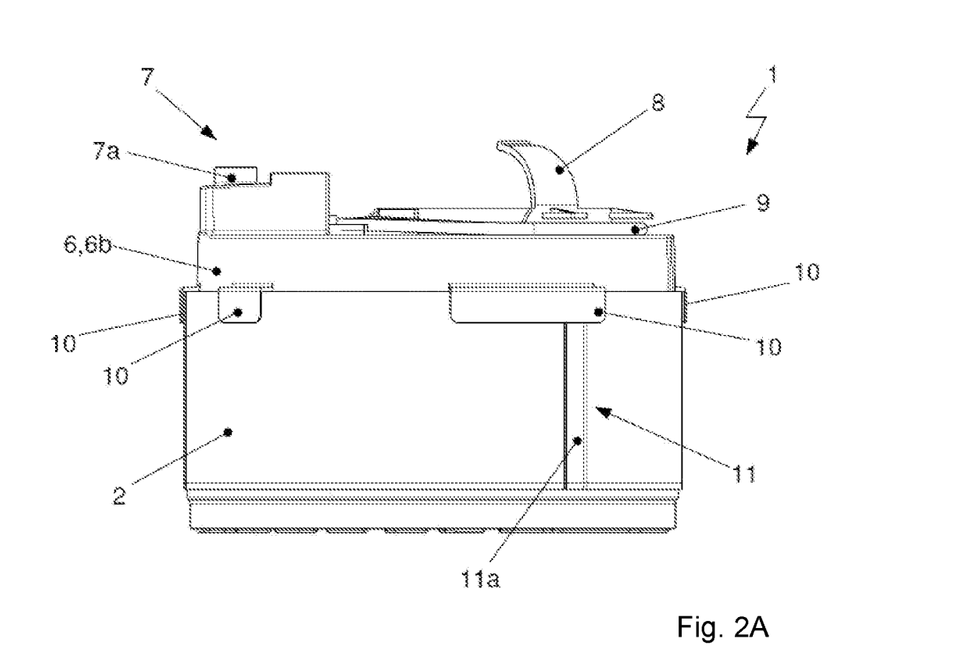
FIGS. 2A and 2B: show the stator from FIG. 1B having the carrier element formed having clamping elements and fixed on the stator core in a perspective side view and a top view.
Figure 2B:
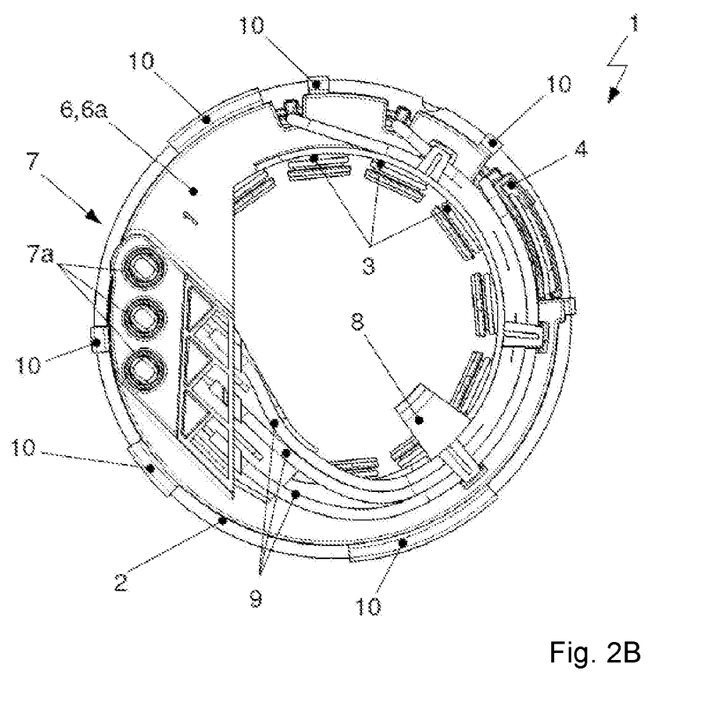
Figure 3A:
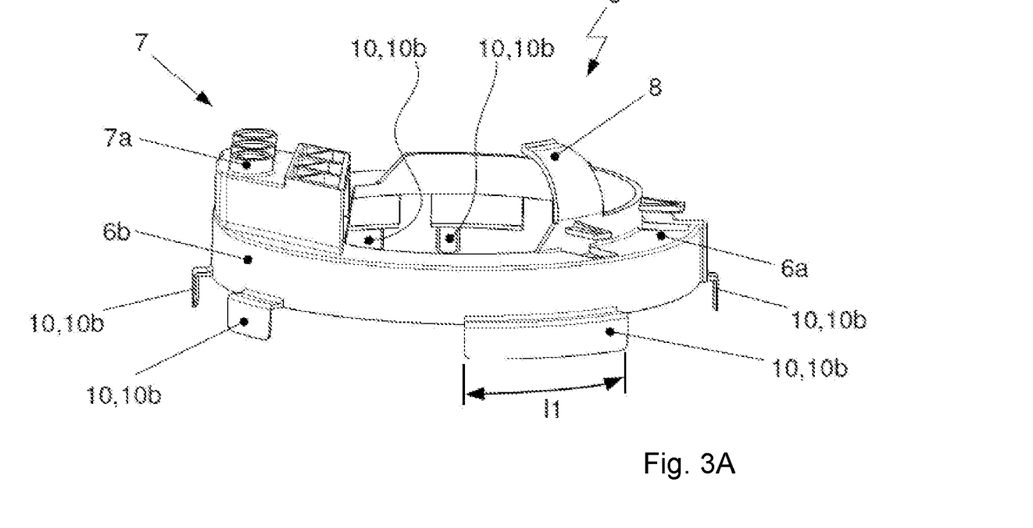
FIGS. 3A and 3B: show the carrier element from FIGS. 2A and 2B in a perspective side view and a top view.
Figure 3B:
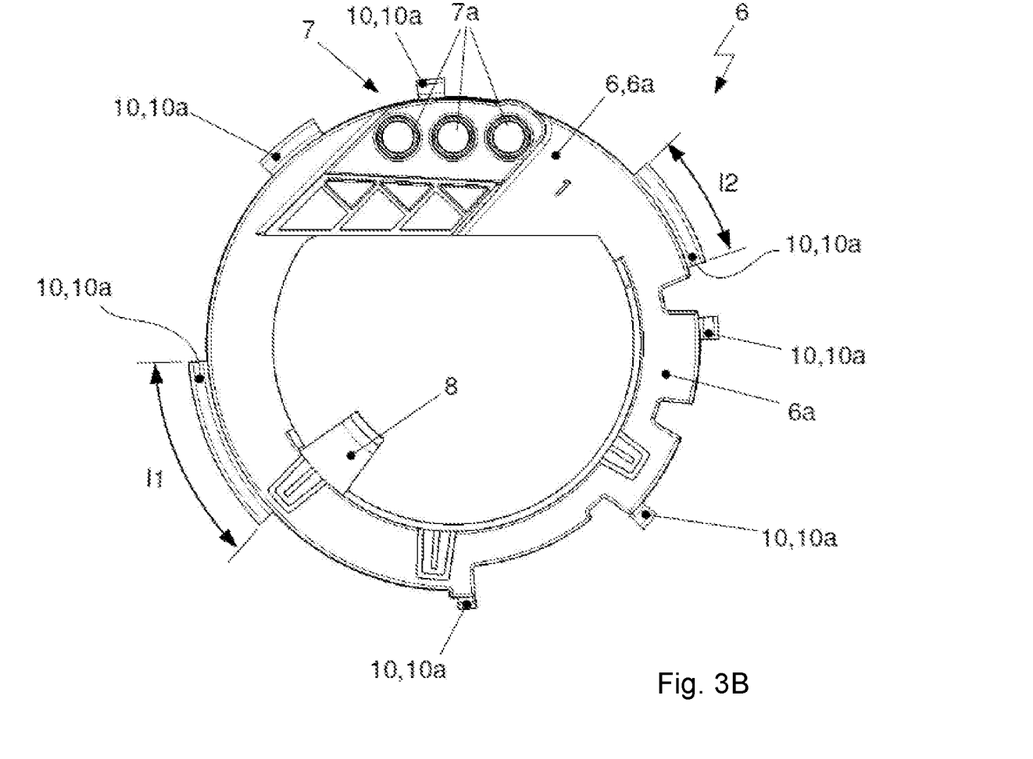

The stator 1 from FIG. 1B having the carrier element 6 formed having clamping elements 10 and fixed on the stator core 2 is shown in a perspective side view and a top view in FIGS. 2A and 2B, while the carrier element 6 from FIGS. 2A and 2B is illustrated in a perspective side view and a top view as an individual component in FIGS. 3A and 3B.

The carrier element 6 is formed having at least one clamping element 10 or a plurality of clamping elements 10, respectively, which are each arranged on a side of the carrier element 6 aligned in the axial direction and facing toward the stator core 2.

The clamping elements 10 are arranged in a region, in particular a free end edge of the axially aligned hollow-cylindrical ring surface 6*b* and preferably have the shape of two legs 10*a*, 10*b* arranged at a right angle in relation to one another in cross section. In this case, a first leg 10*a* is connected along a first end edge to the axially aligned hollow-cylindrical ring surface 6*b* and is arranged facing in the radial direction, while a second leg 10*b* is aligned in the axial direction, respectively. The second leg 10*b* presses with an inner side flatly against the outer side of the outer wall of the stator core 2. The inner side of the second leg 10*b* of the clamping element 10 and the outer side of the outer wall of the stator core 2 are formed having surfaces corresponding to one another for the contact oriented toward one another.

A first free end edge of the second leg 10*b* of the clamping elements 10 is aligned in each case in the direction of the opposing second end face of the stator 1. The legs 10*a*, 10*b* of the clamping elements 10 are connected to one another at second end edges enclosing the right angle. The clamping elements 10 are formed widening the external dimensions of the carrier element 6 in the radial and axial directions.

The clamping elements 10 are each formed, like the receptacle element 7 for the plug housing 7*b* and the pressure element 8, as a component part of the carrier element 6, so that the carrier element 6 having the radial ring surface 6*a*, the axial ring surface 6*b*, the receptacle element 7 having the connecting passages 7*a* for the plug housing 7*b* having the connecting ports, the pressure element 8, and the clamping elements 10 is formed as a unit, in particular as a one-piece injection molded element.

In the embodiment shown in FIGS. 2A, 2B, 3A, and 3B, a plurality of clamping elements 10 is provided, which are arranged distributed around the circumference of the carrier element 6. In this case, the clamping elements 10 each have a different length l1, l2 in the circumferential direction of the carrier element 6 and are aligned in relation to one another at different intervals from one another, in particular at different angles. In an alternative embodiment (not shown) of a carrier element having only one clamping element, the clamping element can be formed over the entire circumference.

The respective arrangement and formation of the clamping elements 10 on the carrier element 6 causes centering of the carrier element 6 on the stator core 2, so that in addition to the clamping element formed over the entire circumference (not shown) or at least in an angle range of at least 270° and thus peripherally, three clamping elements of equal length l can also be provided, for example, which are arranged distributed uniformly over the circumference and thus in particular at an angle of 120° in relation to one another in each case. The angle specification always refers in this case to a defined point or a defined plane extending through the clamping element 10 along the longitudinal axis 5 of the stator 1, such as a middle plane or a plane extending on a lateral edge of the clamping elements.

The at least partially-elastic clamping elements 10 have, as components of the carrier element 6, a defined rigidity corresponding to the geometry and the mechanical dimensions of the carrier element 6 and also in particular an outer side of the outer wall of the stator core 2. During the installation of the carrier element 6 on the stator core 2, a force acting in each case essentially in the radial direction on the stator core 2, in particular a spring force or clamping force, is built up between the clamping elements 10 and the outer side of the outer wall of the stator core 2 and the carrier element 6 is thus pressed because of the elastic properties of the clamping elements 10 against the stator core 2. In this case, the radius of the inner side of the second leg 10b of the clamping element 10 is less in each case than the radius of the outer side of the outer wall of the stator core 2.

With the elastic deformation of the clamping elements 10, the force acts on the stator core 2. Therefore, after the procedure of the installation of the carrier element 6 on the stator core 2, a pre-tension is generated by means of the deformation of the clamping elements 10, which clamps the carrier element 6 and prevents a relative movement of the carrier element 6 and/or of the receptacle element 7 having the plug housing 7b in relation to the stator core 2 in particular during the installation of the electric motor and thus the compressor. The carrier element 6 is especially clamped and fixed in the radial direction on the outer circumference of the stator core 2 by a press fit between the carrier element 6 and the stator core 2. The carrier element 6 is moreover aligned on the outer circumference of the stator core 2.

In this case, the material and the wall thickness of the clamping elements 10 are formed in such a way that the clamping elements 10 can extend beyond the outer radius of the stator core 2, in particular the outer side of the outer wall of the stator core 2, during the installation of the carrier element 6 on the stator core 2 and can also exert a corresponding clamping force on the stator core 2 in the installed state of the carrier element 6 on the stator core 2, so that a nonviolent displacement in the radial and axial directions is not possible and an undesired movement is prevented.

The stator 1 moreover comprises a system 11 for the unique positioning of the carrier element 6 having the receptacle element 7 having the connecting passages 7a for the plug housing 7b having connecting ports for electrically connecting the coils 3 of the stator 1 to the inverter on the stator core 2. A first element 11a of the system 11 is illustrated in FIG. 2A, which is formed as a recess 11a in the form of a groove in the outer side of the outer wall of the stator core 2. The grooved recess 11a is aligned proceeding in the axial direction beginning from the end face of the stator 1, on which the carrier element 6 is arranged, and extends at a constant depth into the outer wall of the stator core 2.

Figure 4A:
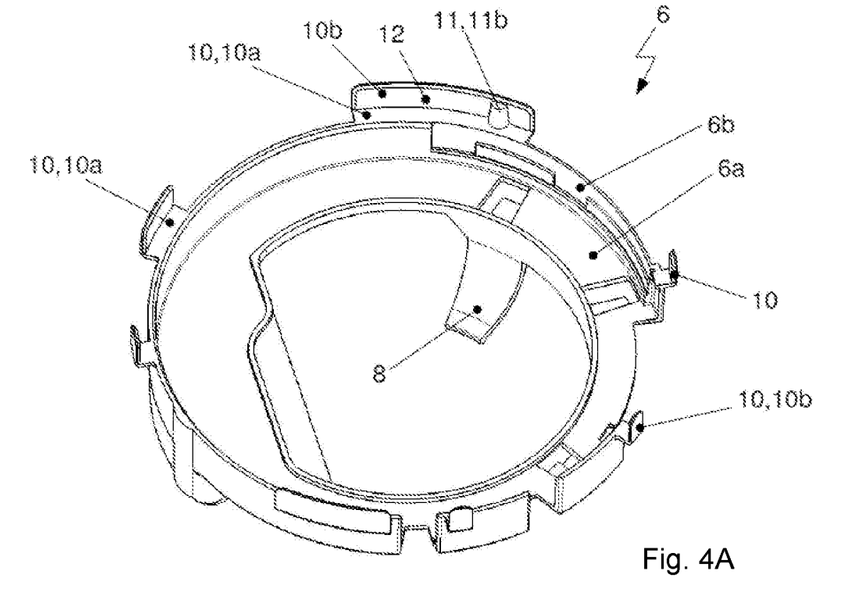
FIGS. 4A and 4B: show detail views of the carrier element from FIGS. 2A and 2B in a perspective illustration and a top view of the side aligned toward the stator core.
Figure 4B:
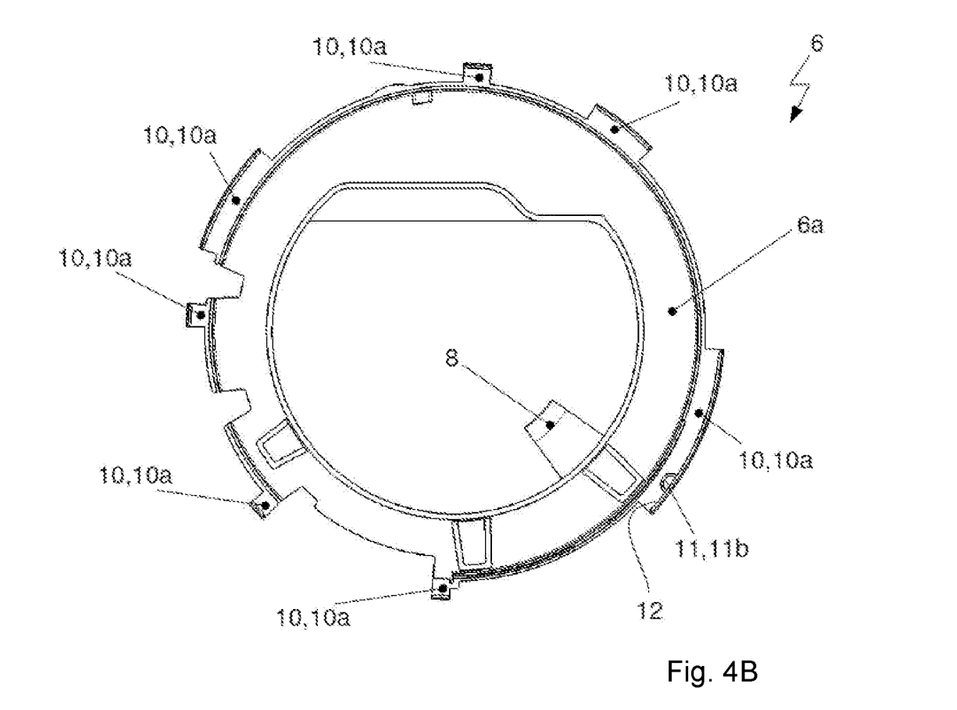
Figure 5:
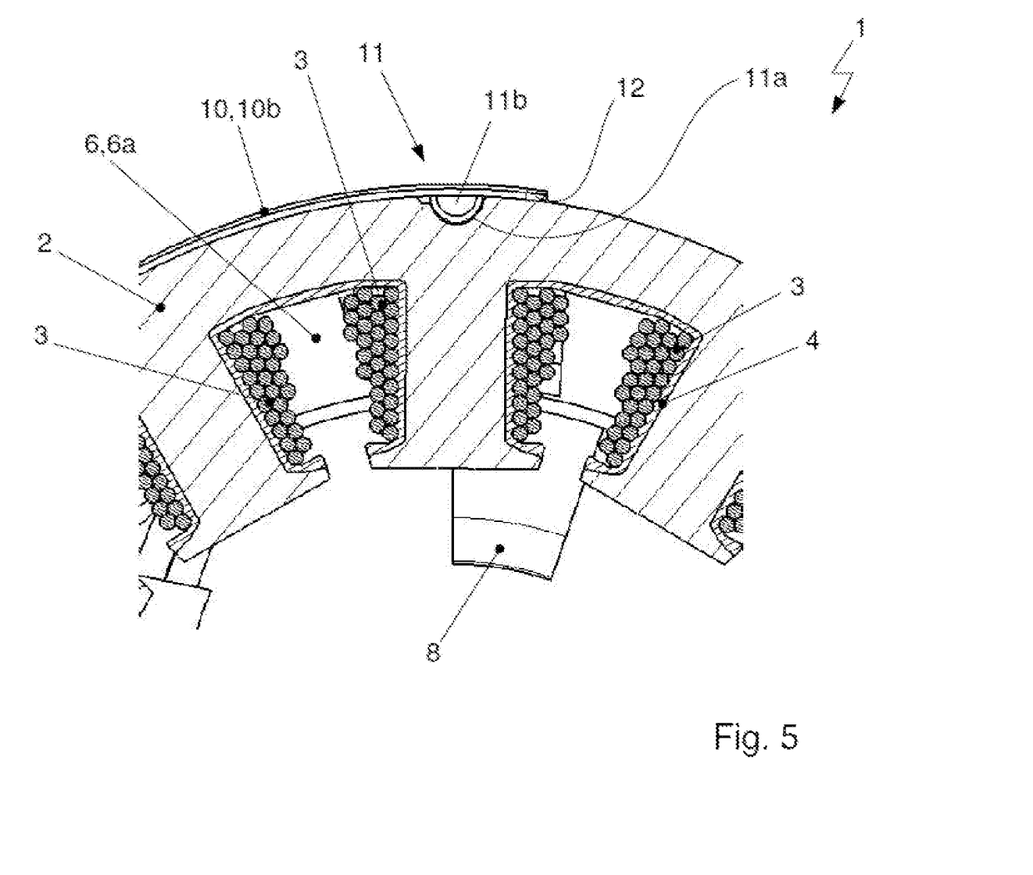
FIG. 5: shows the stator in a preinstalled state of the carrier element on the stator core in a sectional illustration through a system for positioning the carrier element on the stator core.

Detail views of the carrier element 6 from FIGS. 2A and 2B are shown in a perspective illustration and a top view of the side aligned toward the stator core 2 in FIGS. 4A and 4B, while the stator 1 is shown in a pre-installed state of the carrier element 6 on the stator core 2 in a sectional illustration through the system 11 for positioning the carrier element 6 on the stator core 2 in FIG. 5.

The recess 11a formed in the outer side of the outer wall of the stator core 2 has a semicircular cross section according to FIG. 5 in the plane spanned perpendicularly to the longitudinal axis 5 and/or axial direction.

The system 11 for the unique positioning of the carrier element 6 and therefore the receptacle element 7 for the plug housing 7b in the circumferential direction of the stator 1 on the stator core 2 is based on the formation of formfitting elements, so that for each first element 11a of the system 11, a second element 11b corresponding thereto in the shape is provided.

The carrier element 6 comprises, in the region of at least one clamping element 10 on an inner side 12, which faces in the radial direction toward the stator core 2, of the axially aligned second leg 10b in the form of a hollow-cylindrical section, at least one second element 11b of the system 11, which corresponds to the shape of the grooved recess 11a provided on the outer side of the outer wall of the stator core 2 as the first element 11a of the system 11. The second element 11b is formed in this case as a formation 11b protruding from the inner side 12 of the second leg 10b of the clamping element 10 at the transition of the axially aligned second leg 10b to the radially aligned first leg 10a of the clamping element 10. The formation 11b has a semicircular shape originating from the transition of the legs 10a, 10b as the first end and tapering in the direction of the longitudinal axis 5 of the stator 1 in the cross section of the plane spanned perpendicularly to the longitudinal axis 5 and/or the axial direction.

With the semicircular shape, the formation 11b has a geometry and shape corresponding to the recess 11a of the system 11. The form fit of the elements 11a, 11b of the system 11 for positioning is preferably ensured during the installation of the carrier element 6 on the stator core 2 in a movement direction extending along the longitudinal axis 5. In this case, the second element 11b formed on the clamping element 10 of the carrier element 6 engages in the first element 11a formed on the outer side of the outer wall of the stator core 2.

The recess 11a and formation 11b, each formed symmetrically in relation to the longitudinal axis 5, as the elements 11a, 11b of the system 11 can press flatly against one another with the lateral surfaces arranged facing toward one another in the installed state of the carrier element 6 on the stator core 2. The carrier element 6 is thus also fixed by a formfitting connection formed between the carrier element 6, in particular the clamping element 10 of the carrier element 6, and the stator core 2 against twisting around the longitudinal axis 5 and in the radial direction on the stator core 2 and is always arranged uniquely oriented in the desired manner in relation to the stator 1, in order to insert the plug connectors arranged on the inverter and formed as pins into the connecting ports formed in the plug housing 7b during the installation of the electric motor.

The elements 11a, 11b of the system 11 for positioning the carrier element 6 on the stator core 2 are preferably formed in the dimensions and shapes, however, in such a way that in the case of an exact final arrangement of the carrier element 6 on the stator core 2 in the nominal dimensions, the elements 11a, 11b are prevented from pressing against one another.

In the case of a formation of in each case at least two first elements 11a and second elements 11b of the system 11 for the positioning and the twist lock of the carrier element 6 in the circumferential direction of the stator 1, the elements 11a, 11b corresponding to one another are arranged asymmetrically, i.e., at an unequal interval on the circumference or angle in relation to one another, to ensure a unique arrangement of the carrier element 6 having the receptacle element 7 and thus the plug housing 7*b* on the stator core 2.

LIST OF REFERENCE NUMERALS

1 stator
2 stator core
3 coil
4 insulation element
5 longitudinal axis
6 carrier element
6*a* radial ring surface
6*b* axial ring surface
7 receptacle element
7*a* connecting passage
7*b* plug housing
8 pressure element
9 conducting wire
10 clamping element
10*a* first leg
10*b* second leg
11 system for positioning
11*a* first element, recess of system 11
11*b* second element, formation of system 11
12 inner side of second leg 10*b* of clamping element 10
A driveshaft
E electric motor
G housing
L circuit board
R rotor
SE switching element
SV switching device
VA connecting arrangement
VM compression mechanism
l, l1, l2 length, dimensions of clamping element 10

What is claimed is:

1. A device for driving a compressor of a vaporous fluid, in particular an electric motor, comprising:
a rotor and a stator having a stator core, all of which are arranged extending along a common longitudinal axis, wherein a carrier element is arranged pressing against a first end face of the stator, the carrier element aligned with the stator in an axial direction, wherein the stator is formed having at least one receptacle element for a plug housing for accommodating at least one plug connector and also at least one clamping element for fixing the carrier element on the stator core as a coherent unit and one-piece component, wherein the at least one clamping element is arranged on a side of the carrier element aligned in the axial direction and facing toward the stator core, and wherein the at least one clamping element presses with an inner side thereof against an outer side of an outer wall of the stator core, centering the carrier element on the stator core, wherein a radius of the inner side of the at least one clamping element is formed as smaller than a radius of the outer side of the outer wall of the stator core such that the at least one clamping element is elastically deformed, and wherein a spring force or clamping force is built up between the clamping element and the outer side of the outer wall of the stator core, and the carrier element is pressed against the stator core due to the spring force or clamping force of the clamping element and assembled to the stator core.

2. The device according to claim 1, wherein the at least one clamping element has a shape in cross section of two legs arranged at an angle in relation to one another.

3. The device according to claim 2, wherein the two legs of the at least one clamping element are arranged at a right angle in relation to one another.

4. The device according to claim 2, wherein the two legs of the at least one clamping element are arranged enclosing the angle at end edges and pressing against one another at outer lateral edges and are connected to one another.

5. The device according to claim 2, wherein a first one of the two legs of the at least one clamping element is arranged facing in a radial direction and has a shape of a circular ring or a circular ring section.

6. The device according to claim 5, wherein a second one of the two legs of the at least one clamping element is arranged facing in the axial direction and has a shape of a cylinder or a cylinder section.

7. The device according to claim 6, wherein a first, free end edge of the second one of the legs of the at least one clamping element is arranged aligned in a direction of a second end face opposite to the first end face of the stator.

8. The device according to claim 2, wherein the carrier element further comprises a radially aligned ring surface and an axially aligned ring surface, wherein the radially aligned ring surface and the axially aligned ring surface are arranged abutting one another at outer lateral edges and are connected to one another.

9. The device according to claim 8, wherein the radially aligned ring surface of the carrier element has a shape of a circular ring or a circular ring section.

10. The device according to claim 8, wherein the axially aligned ring surface of the carrier element has a shape of a cylinder or a cylinder section.

11. The device according to claim 8, wherein the at least one clamping element is arranged in a region of a free end edge of the axially aligned ring surface.

12. The device according to claim 11, wherein the at least one clamping element is connected along a first end edge of a first one of the two legs to the axially aligned ring surface of the carrier element.

13. The device according to claim 2, wherein the at least one clamping element is arranged, in the region of a second one of the two legs, with the inner side pressing flatly against the outer side of the outer wall of the stator core.

14. The device according to claim 1, wherein the carrier element further comprises a single one of the at least one clamping element which is formed extending over an entire circumference or at least in an angle range of at least 270° around the carrier element.

15. The device according to claim 1, wherein the carrier element further comprises a plurality of the at least one clamping elements, which are arranged distributed over a circumference of the carrier element.

16. The device according to claim 15, wherein the clamping elements are formed having different or equal lengths in a circumferential direction of the carrier element.

17. The device according to claim 15, wherein the clamping elements are arranged at different or equal intervals in relation to one another in the circumferential direction of the carrier element.

18. The device according to claim 15, wherein the carrier element further comprises three clamping elements, which are formed having an equal length and are arranged distributed uniformly around the circumference.

19. The device according to claim 1, wherein a system for positioning the carrier element on the stator core is formed having at least one first element and at least one second element, which together form a form-fitting connection.

20. The device according to claim 19, wherein the at least one first element and the at least one second element each have a shape formed symmetrically in relation to the longitudinal axis.

21. The device according to claim 19, wherein the at least one first element of the system is formed on the outer side of the outer wall of the stator core and the at least one second element of the system is formed on the carrier element.

22. The device according to claim 21, wherein the at least one second element of the system is formed on an inner side of a leg of the at least one clamping element pressing against the stator core.

23. The device according to claim 19, wherein the at least one first element of the system is formed as a recess inside the outer wall of the stator core, which extends, originating from the first end face formed using the carrier element of the stator, in parallel to the longitudinal axis of the stator along the outer side of the outer wall of the stator core.

24. The device according to claim 23, wherein the at least one first element of the system has a shape of a groove.

25. The device according to claim 24, wherein the groove is formed having a semicircular cross section.

26. The device according to claim 19, wherein the at least one second element of the system is formed as a formation which corresponds to a shape of the at least one first element of the system.

27. The device according to claim 26, wherein the at least one second element of the system is formed as a formation protruding from the inner side of the at least one clamping element pressing against the outer side of the outer wall of the stator core, which extends in a direction of the longitudinal axis of the stator and has a semicircular cross section.

28. The device according to claim 27, wherein the at least one second element of the system has a shape tapering in a direction of a second end face opposite to the first end face of the stator, in the direction of the longitudinal axis of the stator.

29. The device according to claim 19, wherein in a case of a formation of in each case at least two first elements and at least two second elements of the system, respective one of the at least two first elements and the at least two second elements corresponding to one another are formed distributed unevenly around a circumference of the stator.

30. The device according to claim 1, wherein the at least one receptacle element is formed having at least one connecting passage, which corresponds to a connecting port of the plug housing for accommodating the at least one plug connector.

31. A method for installing the device for driving the compressor of the vaporous fluid according to claim 1, the method comprising the following steps:
arranging the rotor and the stator on the common longitudinal axis, wherein the stator encloses the rotor in a radial direction, and
arranging the carrier element on the first end face of the stator aligned in the axial direction, wherein the at least one clamping element is arranged on the stator core aligned on the side of the carrier element aligned in the axial direction and facing toward the stator core of the stator and the at least one clamping element is elastically deformed in such a way that a force acting essentially in the radial direction on the stator core is generated between the clamping element and the outer side of the outer wall of the stator core and the carrier element is clamped on the stator core.

32. A use of the device for driving the compressor, in particular the electric motor, for compressing the vaporous fluid according to claim 1 for the compressor of a refrigerant in a refrigeration circuit of a climate control system of a motor vehicle.

* * * * *